UNITED STATES PATENT OFFICE 2,785,994
Patented Mar. 19, 1957

2,785,994

TREATED CELLULOSIC MATERIAL AND METHOD OF PREPARATION THEREOF

David A. Lupfer, Syracuse, N. Y., assignor to General Electric Company, a corporation of New York No Drawing. Application July 29, 1954, Serial No. 446,660

3 Claims. (Cl. 117—76)

My invention relates to the treatment of cellulosic materials and the product resulting therefrom. More particularly it relates to the treatment of cellulosic material with organosilicon compounds and the resulting product.

The use of fibrous cellulosic materials such as kraft paper and the like as a dielectric material, in capacitors, cables, and other electrical devices is well-known. Usually such material is impregnated with a liquid dielectric such as mineral oil, halogenated hydrocarbon and the like. A disadvantage of the use of cellulosic materials in such applications is its hydrophilic nature. It thus contains considerable water, such water detracting from its electrical characteristics and those of devices in which it is utilized.

It is generally accepted that the water associated with cellulose is of two general types. Water is present in such material as a constituent part of the cellulose fiber structure itself. It is only by destroying the cellulose as by charring that such water may be removed. Water is also present in an absorbed or adsorbed state, and it is believed that this water, in the form of fiber-bridging films, contributes to the mechanical strength of fibrous cellulose structures by linking with the H and OH parts of cellulose members on the fibers. These same water films also detract from the electrical characteristics of cellulosic fibrous material in that they afford electrical conducting paths from fiber to fiber or over the surface of the material.

By properly drying the material most of the moisture except that necessary for maintaining the mechanical strength of the material, may be removed and the electrical properties thereby improved. Such treatment may be accomplished by heating kraft paper, for example, in a circulating air oven for 24 hours at 100° C. in an ambient atmosphere which is maintained at 25° C. and 50% relative humidity. However, the hydrophilic nature of the cellulose causes it to readsorb or take up any ambient moisture during use, restoring it to its essentially pre-dried electrically inferior state.

An object of my invention is to provide cellulose material having hydrophobic surfaces and the method of making such material.

Another object of my invention is to provide such a material and method which is not detractive of the electrical qualities of the material.

A further object of my invention is to provide such material and method which enhances its electrical and hydrophobic qualities while causing it to improve its ability to absorb and adsorb hydrocarbon type liquid dielectric or insulating materials.

Briefly, according to my invention I treat dried cellulose with an organosilicon compound under acid conditions to render its surface hydrophobic and, at the same time, more receptive to liquid hydrocarbons. In essence, the treating material is believed to combine with the available OH hydroxyl groups of the cellulose forming an —O— linkage to produce a silanol or a celluloseoxysilane which is held firmly to the cellulose. The mechanism of reaction might be termed a siloxy or ester interchange or hydrolysis of bound water.

In general, silicones of the general formula

are very useful, Y being a group such as OH, OR or repeating silicone group and R is a hydrocarbon group. As used herein, "silicone group" is used to mean an organosiloxane group and refers to a group having a silicon atom joined to an oxygen atom by a silicon-oxygen linkage and having organic radicals attached thereto by carbon-silcon linkages.

The features of my invention which are believed to be novel are set forth with particularity in the appended claims. The invention itself, however, both as to its organization and method of operation, together with further objects and advantages thereof may be better understood by a consideration of the following description.

In preparing cellulose, according to my invention, the material is first dried to remove all excess moisture therefrom and, at the same time, not detract essentially from the mechanical strength thereof. This may be accomplished in any well-known manner. For example, kraft capacitor paper is suitably dried as described above by heating it at a temperature of 100° C. for 24 hours in a circulating air oven located in an ambient temperature at 25° C. and 50% relative humidity. The dried material is then immersed in an organosiloxane which has been acidified or the pH value of which is less than seven. Slight acidification is sufficient. As pointed out above, the organosiloxanes used in my invention may be expressed by the general formula

wherein R is a hydrocarbon group and Y is an OH, an OR, or a repeating silicone group.

Typical of the R hydrocarbon groups are phenyl, methyl, propyl, butyl, and the like. Similar hydrocarbon groups may be used for the R in the Y group. As indicated, Y may also be OH, or a repeating silicone group, preferably of the same type as the basic group. Generally speaking, any silicone of the above description which is a liquid is suitable. While solid material may be used in solution, those materials which are liquid in and of themselves are preferred. On the other hand, liquid organisilicon materials may also be used in conjunction with a solvent in practicing my invention.

The liquid or solution is made slightly acidic by the addition thereto of any well-known acid constituent such as acetic acid, nitric acid, sulfuric acid, and the like. The amount of acid to be added is readily determined by anyone skilled in the art, it only being necessary that the pH of the solution be less than seven. It is preferred that the acid be organic so that there is little likelihood of damaging the cellulose material by chemical attack.

The reaction between the organosilicon treating liquid and the cellulose material takes place at room temperature, although heat may be applied if desired to speed the reaction. Immersion of kraft paper for about 30 minutes at room temperature is sufficient to treat properly and render the paper hydrophobic and, at the same time, more receptive to hydrocarbons. The Y group of the organosilicon material is believed to combine with available hydroxyl groups of the cellulose to form an —O— linkage producing a silanol or celluloseoxysilane. By reason of its linkage integrally to the cellulose molecules themselves, the reaction material forms a part of the surface itself rather than a mere mechanically applied coating which easily separates from the cellulose or permits water to be absorbed. Silicone oils, for example, which are merely used to coat or impregnate the cellulose adhere poorly to the cellulose as opposed to the cellulose treated according to the present invention.

Since the material formed on the surface of the cellulose provides a hydrocarbon surface, the material is not only waterproof but is more receptive to mineral oil and other hydrocarbons which are used as dielectric media in electrical devices such as cables, capacitors, and the like. The desired impregnation may therefore be accomplishd more easily and economically.

While I do not wish to be bound by any particular theory as to the manner in which my invention works, I believe that the water bridges normally formed from fiber to fiber in a cellulose structure are broken and prevented from reforming by the practice of the invention. Since, as pointed out hereinbefore, such water or moisture bridges are believed to contribute substantially to electrical conductivity of the structure and subsequent losses when it is used as a dielectric, the breaking up of such bridges or passageways improves the electrical characteristics.

Not only does my treated cellulose material exhibit less electrical conductivity but the fact that the cellulose is rendered more receptive to hydrocarbons produces a composite dielectric having fewer gas pockets than in untreated material which is hydrophilic.

When kraft paper is treated according to my invention assembled into capacitors as the dielectric spaced material and impregnated with mineral oil, the corona starting voltage is over twice that of units identical in every respect and tested in the same manner except that the kraft paper is not treated according to my invention.

The power factor of electrical devices using my treated cellulose is likewise favorably lowered. For example, in capacitors using spacers of kraft paper impregnated with pentachlorodiphenyl, the power factor of units using my kraft paper treated according to this invention is lower than that of ordinary capacitors using untreated kraft paper by .01% at 26° and from 0.4% to 0.8% at 100° C.

Not only may kraft paper which has been particularly alluded to above be so treated but also may any cellulosic material whose affinity to water is desired to be increased. Manila paper, linen paper, fish paper, and pressboard are other typical materials lending themselves favorably to such treatment. Many others will occur to those skilled in the art.

I have by my invention provided an improved cellulosic dielectric material and the method of making it. This material is characterized by low moisture absorption, enhanced absorption of hydrocarbons, good mechanical strength, increased resistivity, lower power factor, and increased corona starting voltage as compared to similar cellulose material which is not treated according to my invention.

My improved product is brought about not merely by coating cellulose material with a mechanically-adhering material but with one which actually enters into a chemical reaction with the cellulose and as such remains on the cellulose surface over extended periods of time or indefinitely.

While I have described my invention with respect to certain materials and treating process, it will be realized that I desire to protect by the following claims all variations thereof which do not depart from the spirit or scope thereof.

What I claim as new and desired to secure by Letters Patent of the United States is:

1. The method of improving the electrical characteristics of cellulose material which comprises treating the cellulose material with an organosiloxane material consisting essentially of a compound having the formula

where Y is a member selected from the group consisting of an OH group, an OR group, and repeating silicone group and R is a hydrocarbon group, and impregnating the thus treated cellulose material with a liquid dielectric material selected from the group consisting of hydrocarbons and substituted hydrocarbons.

2. The method of improving the electrical characteristics of cellulose material which comprises treating the cellulose material under slightly acid conditions at room temperature with an organosoiloxane material consisting essentially of a compound having the formula

where Y is a member selected from the group consisting of an OH group, an OR group, and repeating silicone group and R is a hydrocarbon group, and impregnating the thus treated cellulose material with a liquid dielectric material selected from the group consisting of hydrocarbons and substituted hydrocarbons.

3. Cellulose material having a hydrophobic layer thereon consisting essentially of an organosiloxane compound having the structure

where Y is a member selected from the group consisting of an OH group, an OR group, and repeating silicone group and R is a hydrocarbon group, said structure being chemically linked to the cellulose material, and a liquid dielectric material selected from the group consisting of hydrocarbons and substituted hydrocarbons impregnating said cellulose material.

References Cited in the file of this patent
UNITED STATES PATENTS

| | | |
|---|---|---|
| 2,258,218 | Rochow | Oct. 7, 1941 |
| 2,371,068 | Rochow | Mar. 6, 1945 |
| 2,377,689 | Hyde | June 5, 1945 |
| 2,380,996 | Rochow | Aug. 7, 1945 |
| 2,439,689 | Hyde | Apr. 13, 1948 |
| 2,458,944 | Hyde | Jan. 11, 1949 |
| 2,517,777 | Fenn | Aug. 8, 1950 |